US011223977B2

(12) United States Patent
Xing et al.

(10) Patent No.: US 11,223,977 B2
(45) Date of Patent: Jan. 11, 2022

(54) SERVICE-BASED DATA RATE CONTROL TO ENHANCE NETWORK PERFORMANCE

(71) Applicant: T-Mobile USA, Inc., Bellevue, WA (US)

(72) Inventors: Shuqing Xing, Bellevue, WA (US); Mark Nikolov Killmov, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 60 days.

(21) Appl. No.: 16/773,455

(22) Filed: Jan. 27, 2020

(65) Prior Publication Data

US 2021/0235326 A1 Jul. 29, 2021

(51) Int. Cl.
*H04W 28/24* (2009.01)
*H04W 28/02* (2009.01)

(52) U.S. Cl.
CPC ....... *H04W 28/24* (2013.01); *H04W 28/0215* (2013.01); *H04W 28/0226* (2013.01); *H04W 28/0268* (2013.01)

(58) Field of Classification Search
CPC ............. H04W 28/02; H04W 28/0226; H04W 28/0231; H04W 28/0236; H04W 28/0284; H04W 28/08; H04W 28/0804; H04W 28/0808; H04W 28/0815; H04W 28/10; H04W 28/16; H04W 28/22; H04W 28/24; H04W 28/0215; H04W 28/0268
See application file for complete search history.

(56) References Cited

U.S. PATENT DOCUMENTS

| 7,058,400 B2 * | 6/2006 | Brooks | H04W 28/22 |
| | | | 455/424 |
| 8,879,386 B2 * | 11/2014 | Satapathy | H04L 47/14 |
| | | | 370/229 |
| 10,959,105 B2 * | 3/2021 | Yerramalli | H04W 72/0406 |
| 10,966,126 B2 * | 3/2021 | Kim | H04W 76/10 |
| 2005/0003865 A1 * | 1/2005 | Lastinger | H04W 16/00 |
| | | | 455/562.1 |
| 2008/0037420 A1 * | 2/2008 | Tang | H04L 1/1607 |
| | | | 370/229 |
| 2011/0047287 A1 * | 2/2011 | Harrang | H04L 47/24 |
| | | | 709/235 |
| 2011/0131319 A1 * | 6/2011 | Harrang | H04W 28/02 |
| | | | 709/224 |
| 2013/0028210 A1 * | 1/2013 | Gage | H04B 7/0413 |
| | | | 370/329 |

(Continued)

*Primary Examiner* — Kevin D Mew
(74) *Attorney, Agent, or Firm* — Lee & Hayes, P.C.

(57) ABSTRACT

A telecommunications network may adjust service (e.g., data rate) to UE devices within an adjustable zone (AZ) that includes at least two types of coverage (e.g., 4G and 5G), depending on services being utilized by the UE devices and current network conditions of the telecommunications network. When a UE device enters the AZ, the services utilized by the UE device are determined. For instance, if the UE device is moving within the AZ, and the LTE is congested, the data rate for the device may be reduced. If the LTE network is not in a heavy loaded condition and the UE device is utilizing an Enhanced Mobile Broadband (EMBB) service, the AZ can be reduced or disabled. Further, the device data rate can be reduced for different services in the AZ to keep more devices in NR coverage.

20 Claims, 5 Drawing Sheets

(56) References Cited

U.S. PATENT DOCUMENTS

| | | | | |
|---|---|---|---|---|
| 2013/0336274 | A1* | 12/2013 | Simonsson | H04J 11/005 370/329 |
| 2014/0328182 | A1* | 11/2014 | Gao | H04W 36/0069 370/236 |
| 2014/0328246 | A1* | 11/2014 | Xu | H04W 88/04 370/315 |
| 2015/0055580 | A1* | 2/2015 | Lim | H04W 52/367 370/329 |
| 2015/0111594 | A1* | 4/2015 | Cui | H04W 36/30 455/453 |
| 2015/0181440 | A1* | 6/2015 | Chen | H04L 5/02 370/329 |
| 2015/0304913 | A1* | 10/2015 | Uusitalo | H04W 4/02 455/444 |
| 2016/0021661 | A1* | 1/2016 | Yerramalli | H04B 17/309 370/329 |
| 2016/0037458 | A1* | 2/2016 | Ponnuswamy | H04W 52/241 370/338 |
| 2016/0105806 | A1* | 4/2016 | Noerpel | H01Q 1/288 455/12.1 |
| 2018/0034736 | A1* | 2/2018 | Anchan | H04W 28/0273 |
| 2021/0014763 | A1* | 1/2021 | Venugopal | H04N 7/24 |
| 2021/0051653 | A1* | 2/2021 | Park | H04W 8/22 |

* cited by examiner

SERVICE-BASED DATA RATE CONTROL TO ENHANCE NETWORK PERFORMANCE

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
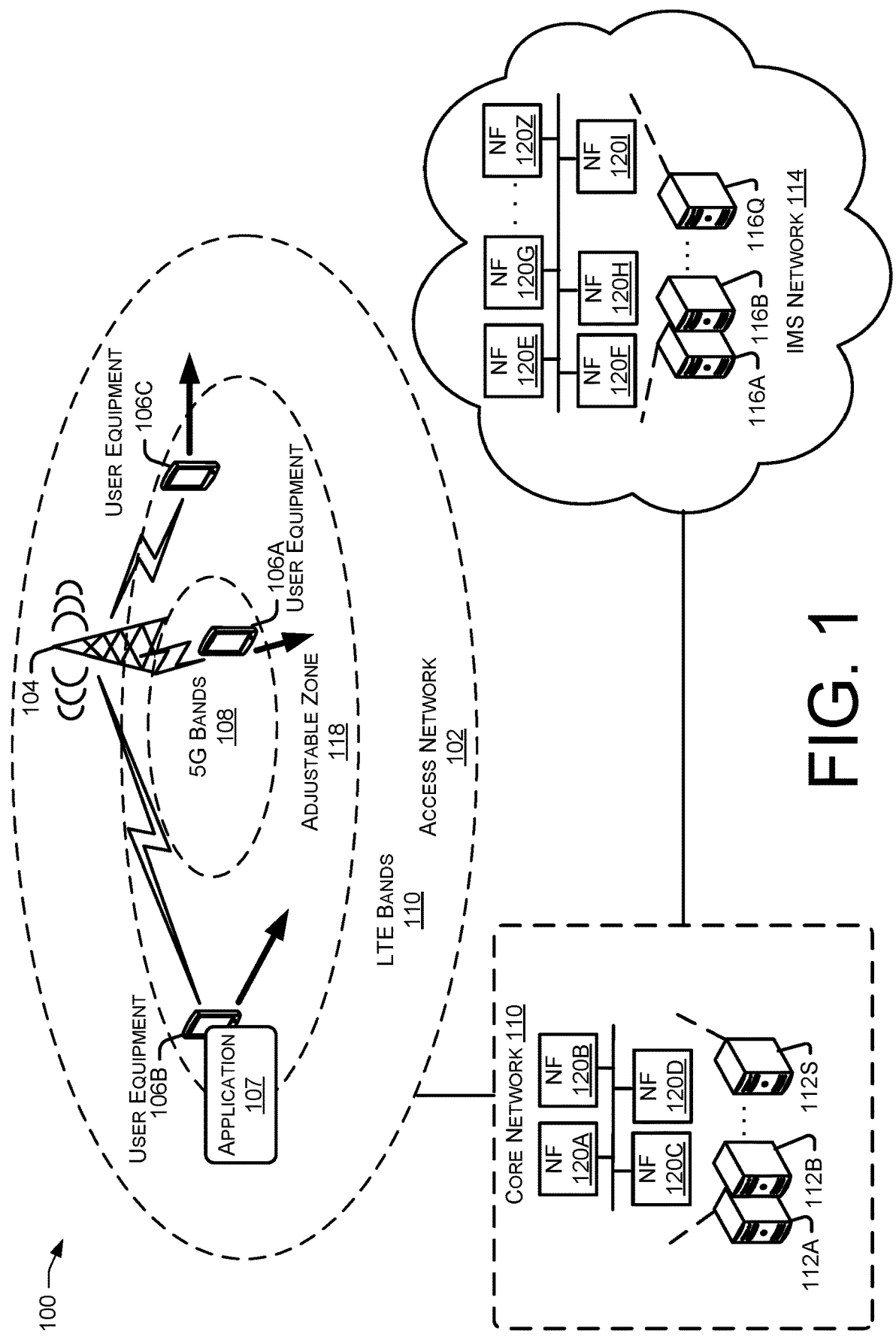
FIG. 1 is a block diagram showing an illustrative environment that utilizes a telecommunications network to adjust service (e.g., data rate) to user equipment devices within an adjustable zone (AZ), that includes the use of different wireless access technologies.

Described herein are techniques and systems relating to a service-based data rate control to enhance network performance for a telecommunications network. Using techniques described herein, an telecommunications network may adjust service (e.g., data rate) to UE devices within an adjustable zone (AZ), that includes the use of different wireless access technologies (e.g., 3G, 4G, 5G, . . . ), depending on services being utilized by the UE devices and current network conditions of the telecommunications network.

Telecommunications networks may utilize a combination of different wireless access technologies (e.g., 3G, 4G, 5G, . . . ) for connectivity to user equipment, such as mobile devices. To provide this dual connectivity, different techniques may be utilized. In some configurations, Evolved-Universal Terrestrial Radio Access-New Radio-Dual Connectivity (EN-DC) is utilized to receive both 4G LTE and 5G signals. EN-DC allows the UE devices to exchange data with a 5G New Radio (NR) base station along with a simultaneous connection to a 4G LTE base station. In other configurations, different techniques may be utilized. While examples provided herein relate to the use of 4G and 5G wireless technologies, as discussed above, different wireless technologies can be utilized.

As an example, using EN-DC, when UE devices move out of 5G New Radio (NR) coverage but is within the AZ, the 5G NR is the default to transfer data. The 5G NR may aggregate/switch over to LTE based on radio frequency (RF) and Radio Link Control (RLC) feedback. Current Standards relating to telecommunications networks do not specify how to reduce system impact when UE devices are moving-out from 5G NR to LTE while still utilizing different 5G services. The bandwidth available on a 5G network is generally much larger compared to the available bandwidth on a 4G LTE network. As a result, when too many UE devices switch to LTE, network congestion may occur.

In order to prevent and/or reduce network congestion, and enhance coverage (e.g., 5G coverage, or some other coverage), an AZ is utilized to reduce the load on another wireless access technology (e.g., LTE) by scheduling a lower data rate in the cell edge for UE devices. When a UE device enters the AZ, the services currently being utilized by the UE device are determined. If the UE device is moving within the AZ, and the LTE is congested, the data rate for the device may be reduced. On the other hand, the AZ can be adjusted larger to keep a 5G footprint. When the LTE is not congested, the data rate may remain constant. When the device moves out of the 5G NR coverage and the AZ, the LTE network provides services to the device. If the LTE network is not in a heavy loaded condition and the UE device is utilizing an Enhanced Mobile Broadband (EMBB) service, the AZ can be reduced or disabled. In other examples, the device data rate can be reduced for different services in the AZ to keep more devices in NR coverage.

The systems, devices, and techniques described herein can improve a functioning of a network by adjusting services provided to UE devices within an AZ based on conditions of a wireless network (e.g., LTE), and services utilized by the UE devices. In this way, users may have a better experience as they move between a first wireless network that uses a first wireless access technology (e.g., 4G) and a second wireless access technology (e.g., 5G). For example, using the techniques described herein, when an LTE network is experiencing congestion, the data rate provided to a UE device within the AZ may be reduced. Similarly, when a device within the AZ is utilizing an Enhanced Mobile Broadband (EMBB) service, the data rate provided to the UE device may remain constant, and/or be adjusted less than if the UE device was not using the EMBB service. These and other improvements to the functioning of a computer and network are discussed herein. More details are provided below with reference to FIGS. 1-5.

FIG. 1 is a block diagram showing an illustrative environment 100 that utilizes a telecommunications network to adjust service (e.g., data rate) to UE devices within an adjustable zone (AZ). In some examples, the telecommunications network is a Non-Stand Alone (NSA) network that includes both 4G coverage and 5G coverage. In other examples, the telecommunications network may utilize other wireless access technologies. The environment 100 may include an access network 102, a core network (CN)

110, and an IMS network 114 that is associated with a wireless service provider(s). The environment 100 is illustrated in simplified form and may include many more components. While 5G networks and 4G networks are discussed herein, the techniques may be applied to telecommunications networks that utilize networks that provide different levels of service and/or bandwidths (e.g., a first radio network having a bandwidth and data rate that is larger and higher compared to a second radio network).

The environment 100 may include cells, such as cell 104, that may be wireless or wired that are coupled to a core network 110 and/or some other network. The environment 100 may also include one or more access points (not shown), and one or more gateways (not shown). A cell, such as cell 104, may handle traffic and signals between electronic devices, such as the user equipment 106, and CN 110. For example, a cell 104 may perform the transcoding of speech channels, allocation of radio channels to electronic devices, paging, transmission and reception of voice and data, as well as other functions. A cell 104 may include several base transceiver stations (BTS), each BTS may include a transceiver, antenna, and additional network switch and control equipment that provide a network cell for facilitating wireless communication between UE computing devices and the core network 110 and/or other networks. In some examples, the cells, such as cell 104, may include a gNodeB and/or an eNodeB.

The user equipment 106, which may also be referred to herein as "user endpoint (UE)", are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 102, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with CN 110, and/or other cellular networks. The UE 106 can further be configured to establish or receive a communication session, such as a voice call, a video call, or another sort of communication.

In some configurations, one or more nodes, such as nodes 112 illustrated in CN 110 and/or nodes 116 illustrated in IMS network 114 may be configured as one or more application servers that provide support for one more applications, such as application 107 utilized by one or more computing devices, such as UE 106. Some example applications include, but are not limited to browser applications, messaging applications, voice applications (e.g., Voice over Internet Protocol "VoIP" applications), video applications, and the like.

While the nodes 112 are illustrated within the CN 110 and nodes 116 are illustrated in IMS network 114, one or more other computing devices may be located outside of these networks. For example, an application server, or some other server or device, may be connected to a network via one or more external packet switched networks, such as the Internet.

According to some configurations, a telephony client application, such as application 107, on the UE 106 may establish data communication with the network 110 through a data connection to the cell 104. The cell 104 may route a communication wired/wirelessly from the UE 106 through the access network 102 for communication to the CN 110. In general, a cell 104 can be implemented as a variety of technologies to provide wired and/or wireless access to the network, as discussed herein. In some instances, the cell 104 can include a New Radio (5G) RAN, a 3GPP RAN, such a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the cell 104 can include any number and type of transceivers and/or base stations representing any number and type of macrocells, microcells, picocells, or femtocells, for example, with any type or amount of overlapping coverage or mutually exclusive coverage. In the current example, the access network 102 utilizes both 5G bands 108 and LTE bands 110 to provide a NSA network.

When a communication request arrives at the network 110, one or more of the nodes 112 may determine the identity of the originating computing device for the communication (e.g., using a telephone number, IMEI, IMSI, IP address) as well as the identity of the computing devices to send the communication. In some configurations, one or more of the nodes 116 may be utilized to determine the identity of the originating computing device for the communication as well as the identity of the computing devices to send the communication. The one or more of the nodes 112, 116 may also identify that the UE 106 is communicating via 5G bands 108, and/or LTE bands 110, as well as a location of the UE 106 within the access network. The nodes 112/116 may also determine other information about the UE 106, such as direction of travel, velocity of the UE 106, and the like. For example, a node 112/116 may identify that UE 106A is within the area of 5G bands 108 but is moving toward (and will soon enter) the AZ 118. Similarly, UE 106B and UE 106C may be identified to be within AZ 118, and that UE 106C is moving out of the AZ and into the LTE bands 110 area. According to some configurations, a UE 106 may connect to the service nodes 112, or some other component such as an application server, via the Internet (not illustrated).

As illustrated, the environment 100 includes one or more servers, including nodes 112 and 116, to facilitate communications by and between the various devices in the environment 100 and perform operations relating to utilizing the IMS network 114, and/or other networks. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 100 (e.g., nodes 112A-112S that provide network functions (NFs) 120A-120D, nodes 116A-116Q that provide NFs 120E-120I, websites, etc.). While FIG. 1 illustrates an example environment 100, it is understood in the context of this document, that the techniques discussed herein may also be implemented in other networking technologies.

As briefly discussed above, the IMS network 114 exposes Network Functions (NFs), such as NFs 120E-120Z, to nodes within a CN, nodes within the IMS network, and/or nodes within some other network. As illustrated, the CN exposes NFs 120A-120D. Utilizing the IMS network 114, a node, such as a node in the CN 110, can communicate with the IMS network 114. In some examples, the nodes may communicate using the Session Initiation Protocol (SIP) protocol, a HTTP/Representational State Transfer (REST) protocol, and/or some other protocol. According to some configurations, the nodes utilize a standard Application Programming Interface (API) to communicate.

Using techniques described herein, a telecommunications network may adjust service (e.g., data rate) to UE devices within an adjustable zone (AZ), that includes the use of different wireless access technologies coverage (e.g., 3G, 4G, 5G, . . . ), depending on services being utilized by the UE devices and current network conditions of the telecommunications network.

Some telecommunications networks utilize both 4G and 5G for connectivity to user equipment, such as UE devices. To provide this dual connectivity, Evolved-Universal Terrestrial Radio Access-New Radio-Dual Connectivity (EN-DC) is utilized to receive both 4G LTE and 5G signals. EN-DC allows the UE devices to exchange data with a 5G New Radio (NR) base station along with a simultaneous connection to a 4G LTE base station. More details are provided below with regard to FIGS. 2-5.

Figure 2:
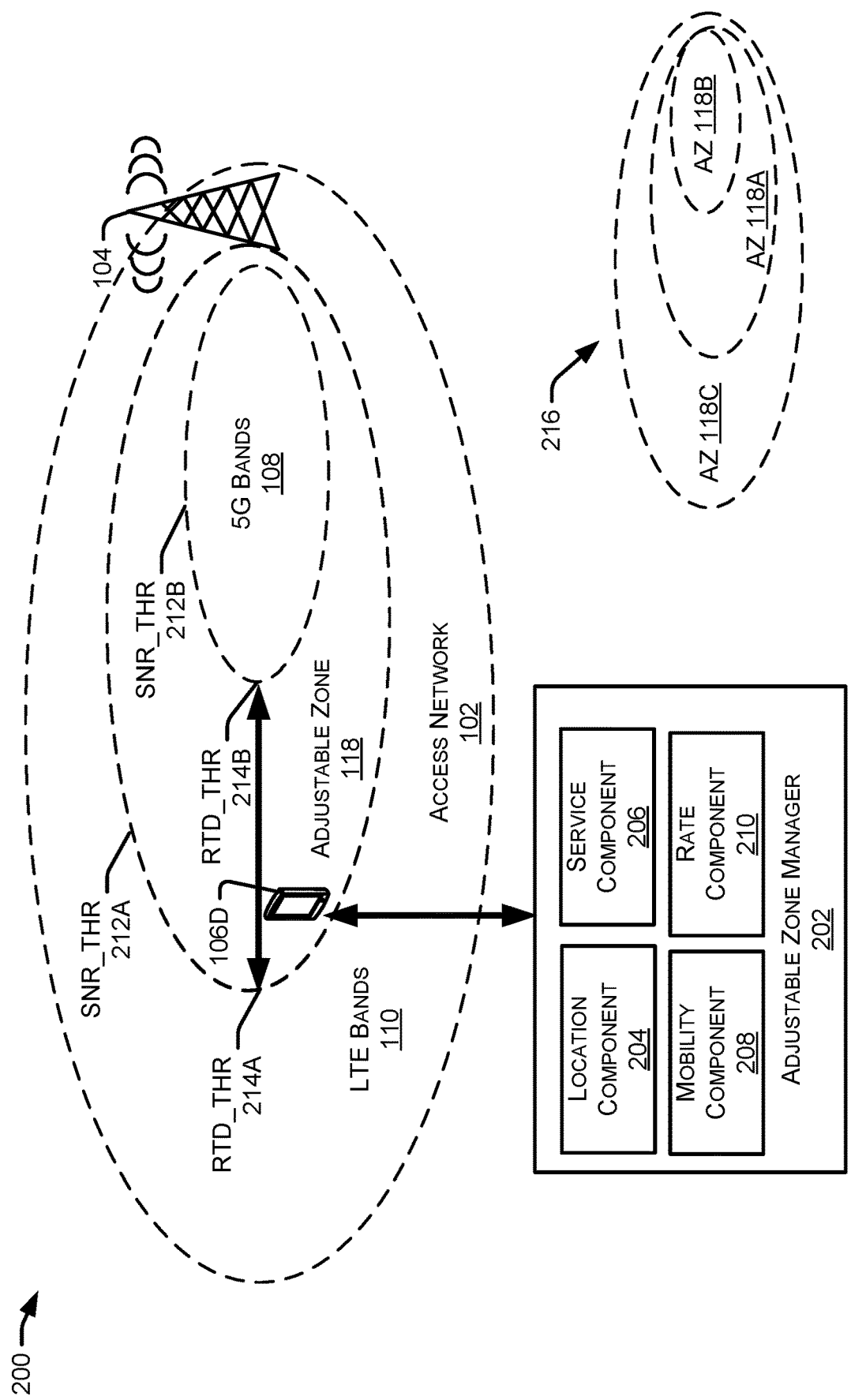
FIG. 2 is a block diagram showing an illustrative environment that includes an adjustable zone manager that may be utilized to adjust a size of an AZ and service within an telecommunications network.

FIG. 2 is a block diagram showing an illustrative environment 200 that includes an adjustable zone manager that may be utilized to adjust a size of an AZ and service within an telecommunications network. The environment 200 illustrates additional details (compared to FIG. 1) on utilizing an AZ 118 within a telecommunications network.

According to some examples, in the system as illustrated in FIG. 2, 4G LTE bands 110 and 5G bands 108 are developed using EN-DC with co-located and non-collocated LTE micro and small cell.

As discussed briefly above, in some systems when a UE 106 moves out of NR coverage (5G bands 108), using EN-DC, the NR remains the default leg to transfer data. In these examples, NR leg data aggregates/switches to LTE leg based on Radio Frequency (RF) and Radio Link Control (RLC) feedback. In some cases, when using multiple Carry Aggregation (CA) and there are multiple UE devices 106 near the edge of 5G bands 108 the telecommunications network can become overloaded or congested and/or the NR coverage might be reduced as well. As discussed above, using techniques described herein, an telecommunications network may adjust service (e.g., data rate) to UE devices 106 within an adjustable zone (AZ) in order to address overloading the telecommunications network. In some configurations, an Adjustable Zone Manager (AZM) provides functionality that may be utilized to adjust data rate provided to the UE devices 106 within the AZ 118 depending on the services being utilized by the UE devices 106, and current network conditions of the telecommunications network.

The AZ 118 is utilized by the AZM 202 to reduce the LTE load by adjusting a data rate (e.g., scheduling lower data rate) for one or more UE devices 106 that are within the AZ 118. For example, the rate component 210 of the AZM 202 may determine the lower data rate for one or more of the UE devices 106 based on the available bandwidth of the LTE network, a predicted availability of bandwidth of the LTE network, a priority associated with delivering data to the UE device 106, and the like. In some configurations, the data rate provided to the one or more UE devices 106 is set such that the LTE portion of the telecommunications network 102 may provide services without becoming congested.

The AZM 202 may also be configured to adjust a size of the AZ 118. In some configurations, the AZM 202 utilizes a service component 206 to identify the services utilized by the UE devices 106, such as UE 106D, that are within the AZ 118. For example, AZM 202 may determine if UE 106D is utilizing EMB services. In some examples, when the LTE portion of the telecommunications network is not in a heavily loaded condition and the UE 106D is not utilizing EMBB service, the AZM 202 may adjust the size of the AZ 118. The size may be determined using different parameters (e.g., latency requirements, . . . ). For example, the AZM 202 may change the size of the AZ 118 as illustrated by indicator 216 that shows three different sizes of AZ 118, including AZ 118A, 118B, and 118C. In some configurations, the AZM 202 may temporarily disable the use of the AZ 118. By adjusting the data rate for a UE 106 for different services in the AZ 118 can keep more UE devices 106 in NR coverage. For example, by determining the services utilized by the UE devices 106 in the AZ 118, and the current load in the telecommunications network 102, the AZM 202 may be able to enable a UE 106 to maintain a low latency service with higher SCS (Sub-Carry Spacing) in NR coverage of a 5G network, while not impacting (or minimally impacting) other UE devices 106.

According to some examples, the AZM 202 may determine different metrics within the access network 102 to assist in determining how/when to adjust a rate of a UE 106. For instance, the AZM 202 may determine RF metrics and RTD (Round Trip Delay) values to determine whether or not a UE 106 is moving within the telecommunications network (e.g., moving from coverage in 5G bands 108 to LTE bands 110, moving from 5G bands 108 to AZ 118, . . . ). The AZM 202 may also determine the load of the different systems (e.g., 5G, 4G LTE) within the telecommunications network.

The AZM 202 may also determine the speed of the UE devices 106. For examples, the mobility component 208 may determine the speed and direction of travel of UE 106D utilizing a location-based service, GPS, radar, RTD, RF condition, and the like. In the current example, the AZM 202 utilizes the location component 204 to determine the location of the UE devices 106 within the access network 102, the mobility component 208 to determine a speed and/or direction of travel of the UE devices within the access network 102, the service component 206 to determine the services utilized by the UE devices 106, and the rate component 210 to adjust the rate of a UE 106, such as UE 106D, when determined. The following is an example flow for determining when to adjust a size of the AZ 118 and/or adjust a rate of one or more UE devices 106.

As discussed above, the AZM 202 may identify the UE devices 106 that are within the AZ 118. In some configurations, the location component 204 may determine if the RTD between 5G bands 108 (RTD_THR 214A) and the edge of AZ 118 (RTD_THR 214B) and determine if the signal to noise ratio (SNR) of SNR 212A is less than SNR 212B to determine if the UE 106D is within the AZ 118. In other examples, different data may be used to determine whether a UE 106 is within the AZ 118.

After determining whether a UE 106 is within an adjustable zone, the AZM 202 may identify the services utilized by the UE 106 utilizing service component 206. For example, is the UE 106 utilizing an EMBB service, and/or some other service that may utilize a large amount of data.

The location component 204 and/or the mobility component 208 may also determine whether or not the UE 106 is moving within the AZ 118, the direction of travel, the speed of travel, and the like. For instance, the AZM 202 may utilize this information to determine if UE 106D is moving out of the AZ 118, staying within AZ 118, or moving into the 5G bands 108 area.

In some configurations, when the UE 106 is not moving or is indicated to be staying within AZ 118, the rate component 210 may adjust the rate for the UE 106 based on the services utilized by the UE 106. In some examples, the data rate may be maintained for the UE 106. When the UE 106 is moving and the LTE is determined to be congested, or may become congested (e.g., exceeds a specified threshold), the rate component 210 may cause the data rate to the UE 106 be reduced by the gNB. When the AZM 202 determines that the LTE is not loaded, the rate component 210 may or may not determine to adjust the rate to the UE 106.

Figure 3:
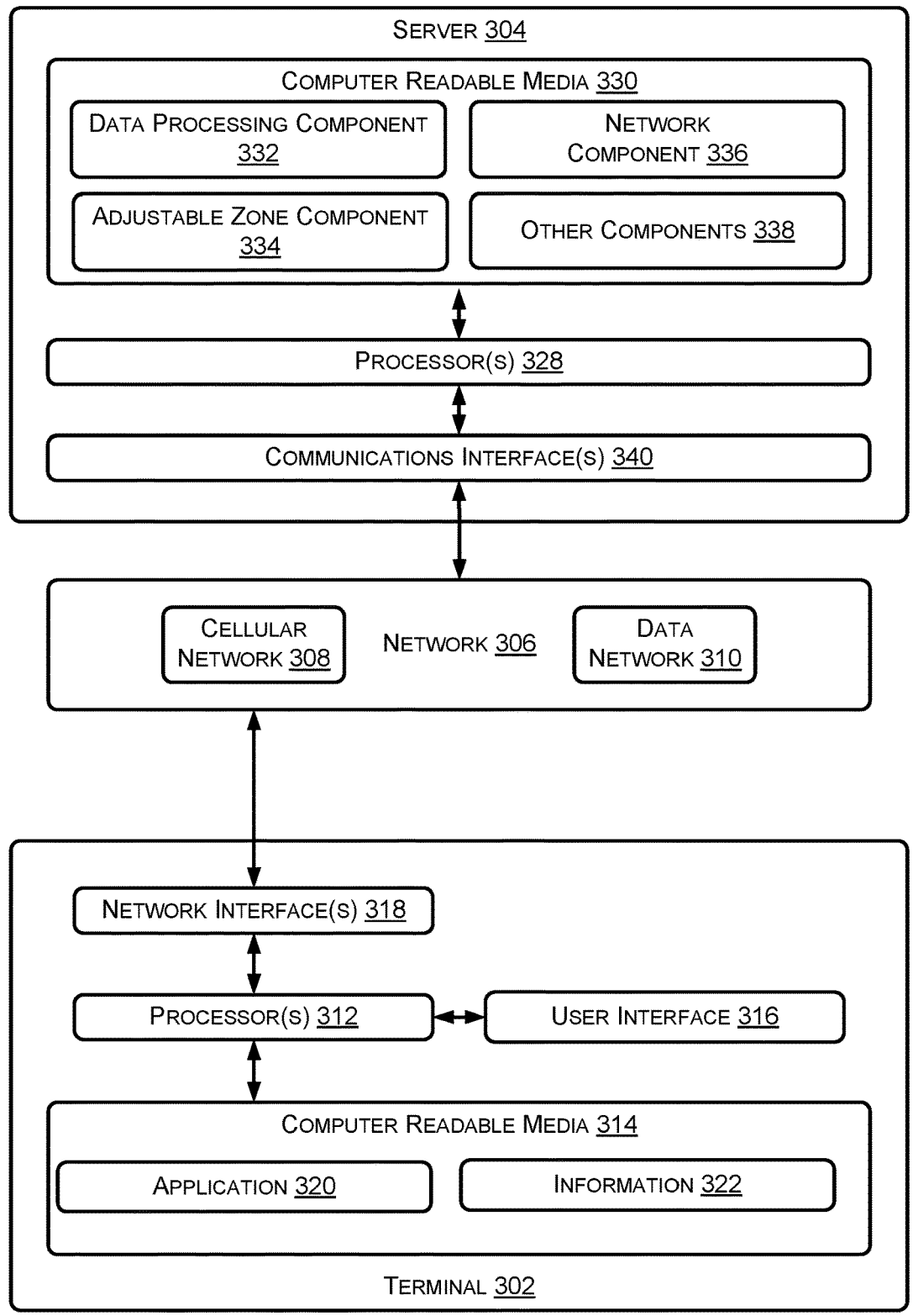
FIG. 3 is a block diagram illustrating a system that includes one or more components for utilizing an AZ within an telecommunications network that includes an AZ.

FIG. 3 is a block diagram illustrating a system 300 that includes one or more components for utilizing an AZ within an telecommunications network that includes an AZ, according to some implementations. The system 300 includes a terminal 302, which can represent a UE 106, or another computing device, coupled to a server 304, via a network 306. The server 304 can represent a computing device, such as one or more of the servers within the access network 102, the CN 110, IMS network 114, and/or some other computing device. The network 306 can represent network 110, 114, and/or access network 102, or some other network.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using one or more technologies such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 304 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various examples herein provide origination and termination of, e.g., carrier-grade voice calls on, e.g., networks 306 using CS transports or mixed VoLTE/5G transports, or on terminals 302 including OEM handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore, e.g., an SQL or NoSQL database, a graph database, a BLOB, or another collection of data. The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 122.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of an application 320. The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a data processing component 332, an adjustable zone component 334 which may configured to adjust service (e.g., data rate) to UE devices within an adjustable zone (AZ), that includes the use of different wireless access technologies (e.g., both 5G coverage and 4G coverage), depending on services being utilized by the UE devices and current network conditions of the telecommunications network. The processor-executable instructions can be executed by the one or more processors 328 to perform various functions described herein.

In some examples, server 304 can communicate with (e.g., is communicatively connectable with) terminal 302 or other devices via one or more communications interface(s) 340, e.g., network transceivers for wired or wireless networks, or memory interfaces. Example communications interface(s) 340 can include ETHERNET or FIBRE CHANNEL transceivers, WIFI radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
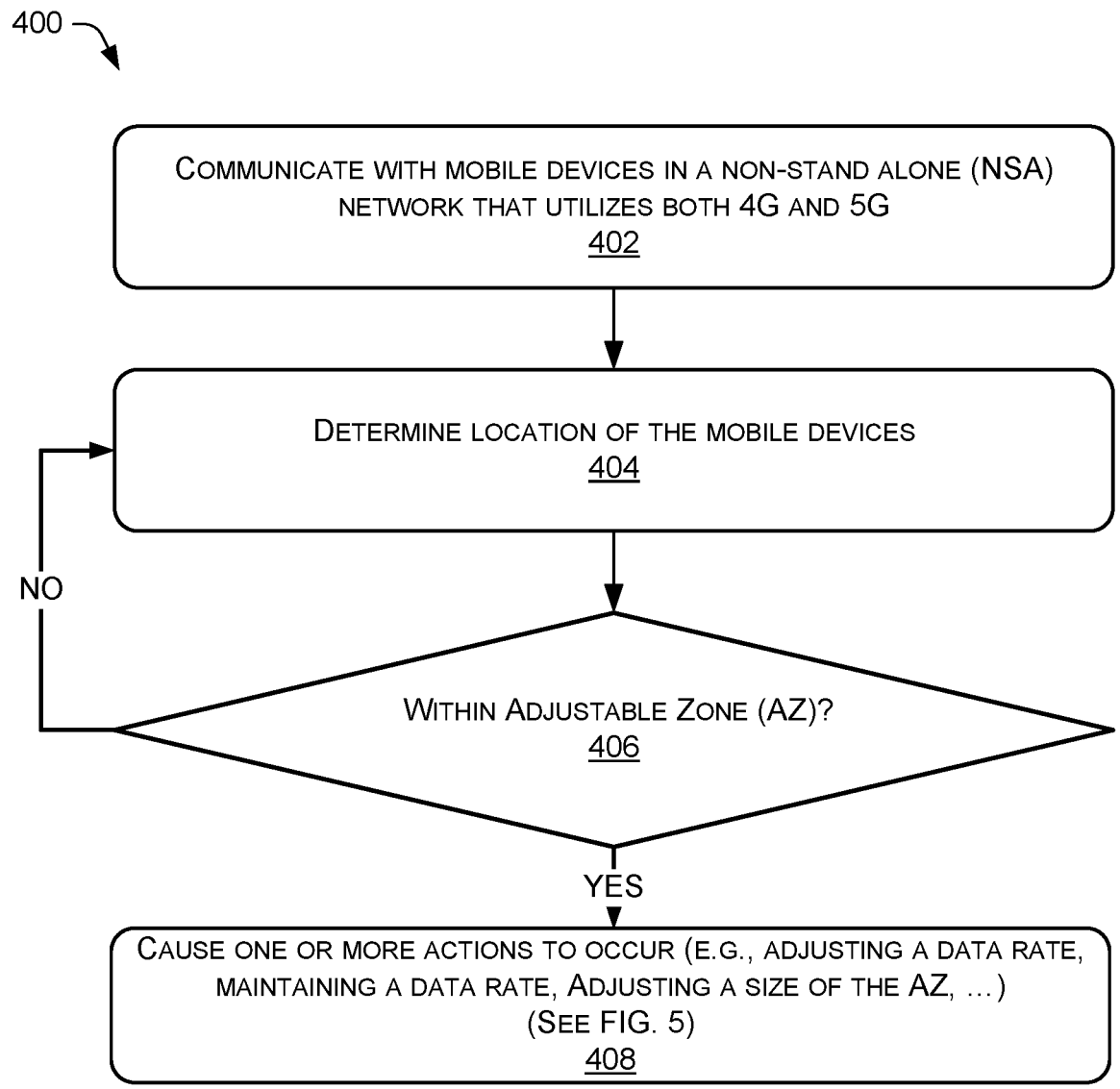
FIG. 4 is a flow diagram of an example process that includes utilizing an AZ within an telecommunications network to provide service, according to some implementations
Figure 5:
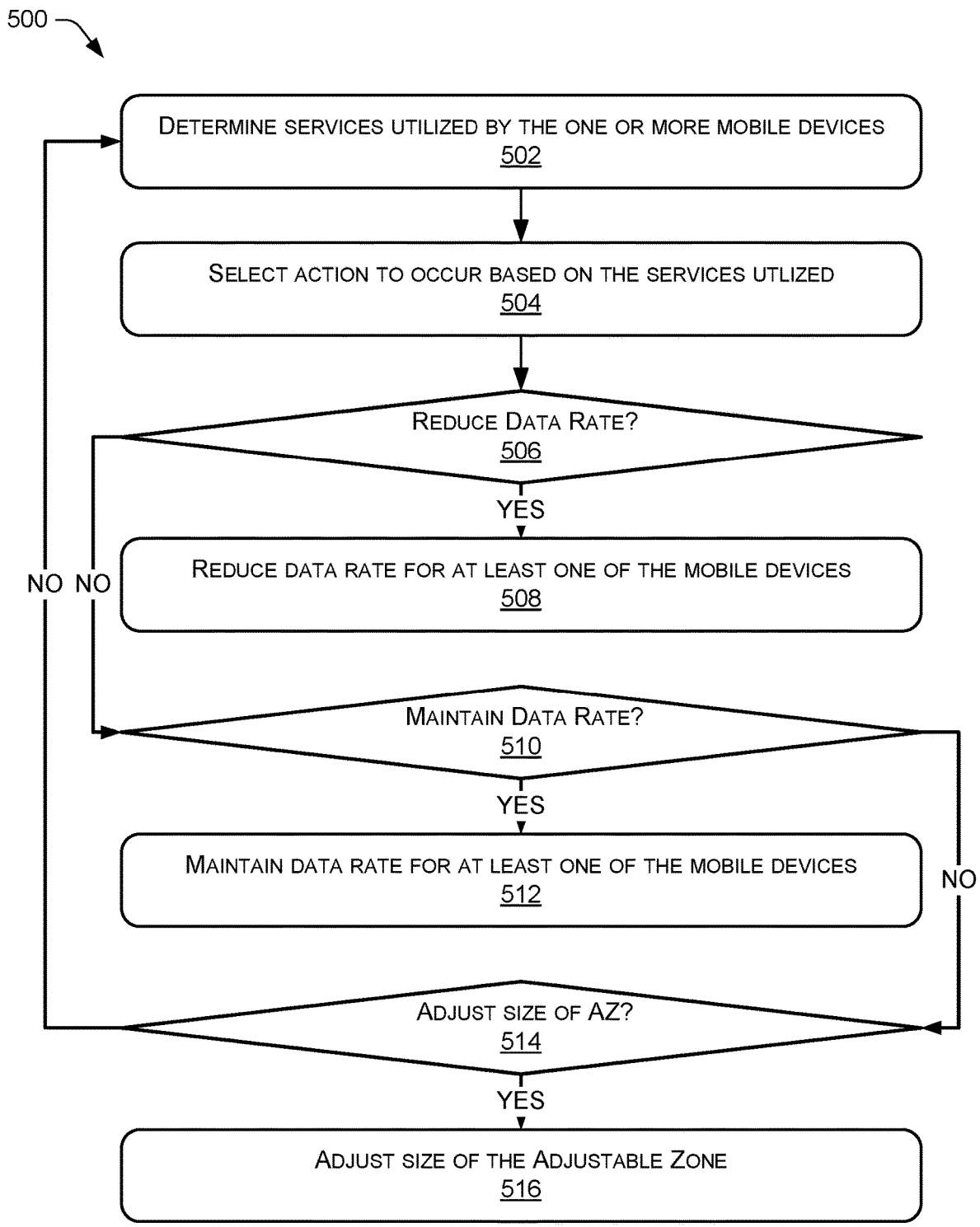
FIG. 5 is a flow diagram of an example process that includes determining actions to perform based on UE devices within an AZ of a telecommunications network, according to some implementations.

FIGS. 4 and 5 illustrate example processes. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates an example process that includes utilizing an AZ within an telecommunications network to provide service, according to some implementations.

The process 400 includes, at 402, communicating with UE devices in a telecommunications network, such as an NSA network that utilizes both 4G and 5G. For example, one or more UE devices 106 within the access network 102 may be utilizing 5G and other UE devices 106 may be utilizing 4G LTE.

At 404, the location of the UE devices 106 are determined. As discussed above, the AZM 202, or some other device or component, may determine the location of the UE devices 106. According to some examples, the location may be determined using one or more of a location-based service, GPS, radar, RTD, RF condition, and the like.

At 406, a determination is made as to whether the UE 106 is within the AZ. As discussed above, the AZM 202, or some other device or component, may determine whether any of the UE devices are within the AZ 118. In some examples, the AZM 202 determines whether the location of the UE devices are within the currently defined AZ 118 by accessing a current size of the AZ 118. As discussed above, the size of the AZ 118 may be changed in size by the AZM 202 depending on the UE devices 106 within the AZ 118, the services currently being utilized, and the network conditions of the 4G LTE network or the 5G network. None, some, or all of the UE devices 106 may be located within the adjustable zone. When the UE 106 is within the AZ, the process 400 flows to 408. When the UE 106 is not within the AZ, the process 400 flows to 404.

At 408, one or more actions are caused to be performed. As discussed above, the AZM 202 may determine to adjust a data rate, maintain a data rate, adjust the size of the AZ 118, and/or perform some other action. See FIG. 5 for more details.

FIG. 5 illustrates an example process that includes determining actions to perform based on UE devices 106 within an AZ 118 of an telecommunications network 102, according to some implementations.

The process 500 includes, at 502, determining the services that are utilized by the UE devices 106 that are within an adjustable zone in a telecommunications network that utilizes different wireless access technologies. For example, one or more UE devices 106 may be utilizing 5G and other UE devices 106 may be utilizing 4G LTE.

At 504, an action to occur is selected based at least in part on the services utilized. As discussed above, the AZM 202 may determine to adjust a data rate, maintain a data rate, adjust the size of the AZ 118, and/or perform some other action.

At 506, a determination is made as to whether to reduce the data rate to a UE device 106 that is within the AZ 118. As discussed above, the AZM 202, or some other device or component, may determine to reduce the rate to the UE 106 when the 4G LTE network is determined to be congested, or may become congested, the UE 106. When the rate to the UE 106 is to be reduced, the process 500 flows to 508 where the data rate is reduced to the UE 106. When the data rate is not to be reduced, the process 500 flows to 510.

At 508, a determination is made as to whether to maintain the data rate to a UE device 106 that is within the AZ 118. As discussed above, the AZM 202, or some other device or component, may determine to maintain the data rate to the UE 106 when the 4G LTE network is determined to be uncongested. When the data rate to the UE 106 is to be maintained, the process 500 flows to 512 where the data rate is maintained to the UE 106. When the data rate is not to be maintained, the process 500 flows to 514.

At 514, a determination is made as to whether to adjust the size of the AZ 118. As discussed above, the AZM 202, or some other device or component, may determine to adjust the size of the AZ 118 when the 4G LTE portion of the telecommunications network 102 is not in a heavily loaded condition and the UE is not utilizing an EMBB service. In some configurations, the AZM 202 may temporarily disable the use of the AZ 118. When the size of the AZ 118 is not to be adjusted, the process 500 may return to 502. When the size of the AZ 118 is to be adjusted, the process 500 flows to 516 where the size of the AZ 118 is adjusted.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
one or more processors;
at least one memory; and
one or more components stored in the at least one memory and executable by the one or more processors to perform operations comprising:
communicating with user equipment (UE) devices in a telecommunications network that utilizes a first wireless access technology connection and a second wireless access technology connection for connectivity;
determining that one or more of the UE devices are within an Adjustable Zone (AZ), wherein a size of the AZ is dynamically configurable and includes first coverage using a first wireless network and second coverage using a second wireless network; and
causing one or more actions to occur based at least in part on the one more UE devices being within the AZ, wherein the one or more actions include reducing a data rate associated with at least one of the one or more UE devices, or maintaining the data rate associated with the at least one of the one or more UE devices,
wherein the AZ comprises a cell edge of the second coverage of the second wireless network.

2. The system of claim 1, further comprising determining one or more services utilized by the one or more UE devices, and wherein causing the one more actions is based, at least in part, on the one or more services utilized.

3. The system of claim 2, wherein causing the one or more actions to occur includes reducing one or more data rates associated with at least one of the one or more services utilized by the one or more UE devices within the AZ.

4. The system of claim 1, further comprising determining that the second wireless network is congested, and wherein causing the one or more actions to occur includes reducing the data rate for at least one of the one or more UE devices within the AZ.

5. The system of claim 1, further comprising determining that the second wireless network is uncongested, and wherein causing the one or more actions to occur includes maintaining the data rate for the one or more UE devices within the AZ.

6. The system of claim 1, further comprising adjusting a size of the AZ based, at least in part, on a congestion of the second wireless network and services utilized by the one or more UE devices.

7. The system of claim 1, further comprising disabling a use of the AZ based, at least in part, on a congestion of the second wireless network and services utilized by the one or more UE devices.

8. A computer-implemented method performed by one or more processors configured with specific instructions, the computer-implemented method comprising:
communicating with user equipment (UE) devices in a telecommunications network that utilizes a first wireless access technology connection and a second wireless access technology connection for connectivity;
determining that one or more of the UE devices are within an Adjustable Zone (AZ), wherein a size of the AZ is dynamically configurable and includes first coverage using a first wireless network and second coverage using a second wireless network; and
causing one or more actions to occur based at least in part on the one more UE devices being within the AZ, wherein the one or more actions include reducing a data rate associated with at least one of the one or more UE devices, or maintaining the data rate associated with the at least one of the one or more UE devices,
wherein the AZ comprises a cell edge of the second coverage of the second wireless network.

9. The computer-implemented method of claim 8, further comprising determining one or more services utilized by the one more UE devices, and wherein causing the one more actions is based, at least in part, on the one or more services utilized.

10. The computer-implemented method of claim 9, wherein causing the one or more actions to occur includes reducing one or more data rates associated with at least one of the one or more services utilized by the one or more UE devices within the AZ.

11. The computer-implemented method of claim 8, further comprising determining that the second wireless network is congested, and wherein causing the one or more actions to occur includes reducing the data rate for at least one of the one or more UE devices within the AZ.

12. The computer-implemented method of claim 8, further comprising determining that the second wireless network is uncongested, and wherein causing the one or more actions to occur includes maintaining the data rate for the one or more UE devices within the AZ.

13. The computer-implemented method of claim 8, further comprising adjusting a size of the AZ based, at least in part, on a congestion of the second wireless network.

14. The computer-implemented method of claim 8, further comprising determining that the one or more UE devices are likely to move outside of the AZ, based at least in part on a speed and a direction of travel associated with the one or more UE devices, and wherein causing the one or more actions to occur includes reducing the data rate for the one or more UE devices.

15. A non-transitory computer-readable medium storing instructions that, when executed, cause one or more processors to perform operations, comprising:
communicating with user equipment (UE) devices in a telecommunications network that utilizes a first radio network having a first bandwidth and a second radio network having a second bandwidth that is less than the first bandwidth for connectivity;
determining that one or more of the UE devices are within an Adjustable Zone (AZ), wherein a size of the AZ is dynamically configurable and includes first coverage using the first radio network and second coverage using the second radio network; and causing one or more actions to occur based at least in part on the one more UE devices being within the AZ, wherein the one or more actions include reducing a data rate associated with at least one of the one or more UE devices, or maintaining the data rate associated with the at least one of the one or more UE devices, wherein the AZ comprises a cell edge of the second coverage of the second wireless network.

16. The non-transitory computer-readable medium of claim 15, further comprising determining one or more services utilized by the one more UE devices, and wherein causing the one more actions is based, at least in part, on the one or more services utilized.

17. The non-transitory computer-readable medium of claim 16, wherein causing the one or more actions to occur includes reducing one or more data rates associated with at least one of the one or more services utilized by the one or more UE devices within the AZ.

18. The non-transitory computer-readable medium of claim 15, further comprising determining that the second radio network is congested, and wherein causing the one or more actions to occur includes reducing the data rate for at least one of the one or more UE devices within the AZ.

19. The non-transitory computer-readable medium of claim 18, further comprising determining that the second radio network is uncongested, and wherein causing the one or more actions to occur includes maintaining the data rate for the one or more UE devices within the AZ.

20. The non-transitory computer-readable medium of claim 15, further comprising reducing a size of the AZ based, at least in part, on a congestion of the second radio network.

* * * * *